US006589647B1

(12) United States Patent
Ozawa et al.

(10) Patent No.: US 6,589,647 B1
(45) Date of Patent: Jul. 8, 2003

(54) THERMOPLASTIC ELASTOMER COMPOSITION

(75) Inventors: Osamu Ozawa, Kanagawa (JP); Kazuhiro Imada, Kanagawa (JP)

(73) Assignee: The Yokohama Rubber Company, Ltd., Kanagawa Prefecture (JP)

( * ) Notice: Subject to any disclaimer, the term of this patent is extended or adjusted under 35 U.S.C. 154(b) by 0 days.

(21) Appl. No.: 09/385,455

(22) Filed: Aug. 30, 1999

(51) Int. Cl.[7] .................................................. B32B 5/16
(52) U.S. Cl. ....................................... 428/327; 428/407
(58) Field of Search ................................ 428/403, 407, 428/323, 327

(56) References Cited

U.S. PATENT DOCUMENTS 4,743,670 A * 5/1988 Yoshida et al. ............... 528/15
4,898,689 A * 2/1990 Hamada et al. ............. 252/510
5,409,968 A * 4/1995 Clatanoff et al. ........... 523/204

FOREIGN PATENT DOCUMENTS

JP 3-89357 4/1991

* cited by examiner

*Primary Examiner*—Hoa T. Le
(74) *Attorney, Agent, or Firm*—Rader, Fishman & Grauer

(57) ABSTRACT

In a thermoplastic elastomer having a matrix phase of a thermoplastic resin and a domain phase of rubber particles at least a part of which is crosslinked, use is made of rubber particles at least a part of which is conductive to provide a conductive thermoplastic elastomer composition having a volume resistivity that can be controlled over a wide range of from a conductive region ($10^4$ ((Ω·cm) or less) to an insulating region ($10^{13}$ (Ω·cm) or more).

6 Claims, 1 Drawing Sheet

23

22

THERMOPLASTIC ELASTOMER COMPOSITION

BACKGROUND OF THE INVENTION

The present invention relates to a thermoplastic elastomer composition whose volume resistivity can be controlled within a wide range of from $10^4$ to $10^{13}$ (Ω·cm) and a method for controlling the volume resistivity of a composition so that it can have a desired conductivity.

Recently, in a product to which a composition having a conductivity is applied, such as an OA appliance, a semiconductive rubber composition and a thermoplastic elastomer composition having a resistivity in a region on the order of $10^5$ to $10^9$ (Ω·cm) (in a semiconductive region) has been increasingly demanded.

However, conventionally, semiconductive rubber compositions have been controlled of the resistivity of the composition by imparting conductivity by addition of conductivity imparting agents having conductivity, such as carbon black. For this reason, a decreased amount of conductivity imparting agent is added in order to adjust the resistivity to a region on the order of $10^5$ to $10^9$ (Ω·cm). However, it is extremely difficult to uniformly disperse the conductivity imparting agent in the composition in low concentrations and there arises the problem that the resultant composition has a resistivity that fluctuates to a greater extent. To solve this problem, it is necessary to improve the dispersibility of conductivity imparting agents and many proposals have been made to allow conductivity and dispersibility to coexist but their improvement has been difficult and no semiconductive composition that can be put to practical use has been obtained yet.

Japanese Patent Application Laid-open No. Hei 3-89357 proposes a semiconductive belt for OA appliance made of polycarbonate containing a conductive carbon. However, it is very difficult to control the resistivity of the polymer composition in a semiconductive region and it is almost impossible to obtain a desired resistivity by addition of a conductive carbon to ordinary polymers.

As described in, e.g., Sumita, et al., Kobunshi Kakou (Polymer Processing), Vol. 43, No. 4 (1994), according as carbon is added increasingly in a polymer, the conductivity of the mixture remains low (resistivity is high) while the amount of carbon added is small and after a certain threshold the carbon forms a conductor circuit and the conductivity increases abruptly (resistivity decreases) so that medium resistivity cannot be obtained.

In the case where a foam such as urethane foam is utilized as the semiconductive composition, the distribution of the conductive imparting agent in the foam depends of the condition of the foam so that it is difficult to control such that the distribution becomes uniform and it is also difficult to obtain a semiconductive composition having a non-fluctuating resistivity using a foam.

SUMMARY OF THE INVENTION

One object of the present invention is to provide a thermoplastic elastomer composition having a desired volume resistivity. Preferably, the present invention is to provide a thermoplastic elastomer having a conductivity (volume resistivity) from a conductive region ($10^4$ ((Ω·cm) or less) to an insulating region ($10^{13}$ (Ω·cm) or more), more preferably from a conductive region ($10^4$ (Ω·cm) or less) to an insulating region ($10^{10}$ (Ω·cm) or more), or furthermore in a semiconductive region ($10^5$ to $10^9$ (Ω·cm)) and a method of controlling the volume resistivity of a composition so as to have a desired conductivity.

That is, the present invention provides a thermoplastic elastomer composition comprising a thermoplastic resin as a matrix phase and a rubber particle at least a part of which is crosslinked as a domain phase, wherein the rubber particle is a rubber particle at least a portion of which has a conductivity to give the composition a controlled volume resistivity.

The controlled volume resistivity of the thermoplastic elastomer composition is preferably $10^4$ to $10^{13}$ (Ω·cm) and more preferably $10^4$ to $10^{10}$ (Ω·cm)

Preferably, the rubber particle contains a conductivity imparting agent selected from metal powder having a volume resistivity of $10^{-6}$ to $10^{-1}$ (Ω·cm) and/or conductive carbon black.

The controlled volume resistivity of the thermoplastic elastomer composition is preferably $10^5$ to $10^9$ (Ω·cm).

Preferably, the rubber particle is of a two layer structure which comprises a core and an outer layer and at least the outer layer contains the conductivity imparting agent.

The present invention provides a method of controlling a volume resistivity of the composition, comprising controlling a volume resistivity of the composition comprising a thermoplastic resin as a matrix phase and a rubber particle at least a part of which is crosslinked and which contains a conductivity imparting agent as a domain phase, by controlling of volume fraction of the rubber particle having a conductivity, size of rubber particle containing the conductivity imparting agent, dispersibility of rubber particle containing the conductivity imparting agent, or structure of rubber particle.

DESCRIPTION OF THE PREFERRED EMBODIMENTS

Hereafter, the present invention will be described in detail.

The thermoplastic elastomer composition of the present invention (hereafter, referred to as the inventive composition) comprises a matrix phase (homogeneous phase) of a thermoplastic resin and a domain phase (dispersed phase) of rubber particle which is crosslinked, at least a part of the rubber particle has a conductivity and a conductivity imparting agent is added such that its volume resistivity (electric resistance) is lower than the volume resistivity (electric resistance) of the matrix phase.

The reason for a decreased fluctuation and stabilization of volume resistivity by use of the thermoplastic elastomer composition of the present invention is as follows.

Figure 1:
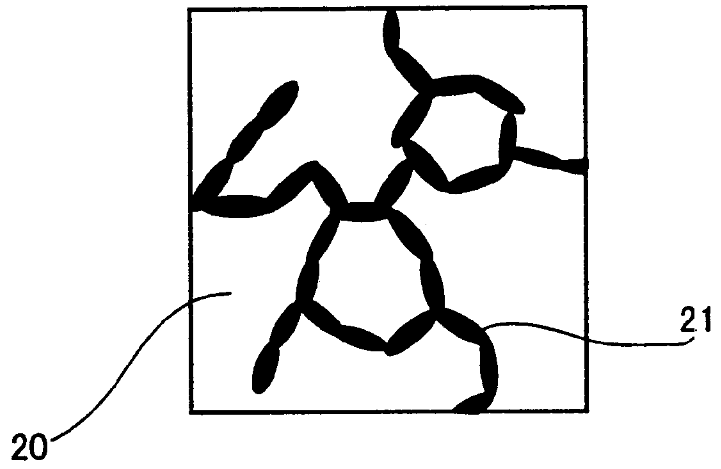
FIG. 1 is a schematic diagram illustrating dispersion of carbon black in a polymer.

As is described in literature such as Sumita, et al. above, in the method shown in FIG. 1, in which carbon black 21 is directly mixed in a polymer 20, by addition of an increased amount of carbon black 21 to the polymer 20, the carbon thus far dispersed uniformly abruptly forms a conductive circuit to increase the conductivity (decrease resistivity) abruptly at a certain addition amount and it is very difficult to control the volume resistivity to a medium conductivity, that is, in a semiconductive region.

Figure 2:
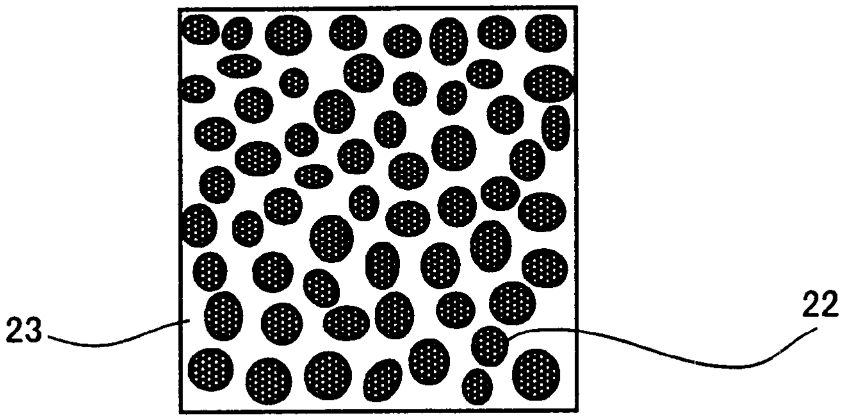
FIG. 2 is a schematic diagram illustrating dispersion of a rubber containing carbon black in a thermoplastic resin.

However, in the case of the thermoplastic elastomer composition used in the present invention, as shown in FIG. 2, rubber 22 containing a conductivity imparting agent such as carbon black in an amount sufficient to impart conductivity is prepared in advance and the rubber 22 and a thermoplastic resin 23 are kneaded together and during the kneading the rubber is crosslinked such that the conductive rubber phase is dispersed and fixed in the thermoplastic resin. In this construction, the rubber particles cannot bond to each other so that no conductive circuit is formed and the conductivity is developed by a so called tunneling effect in which electrons jump between the rubber particles having conductivity.

In this case, the volume resistivity depends on the distance between rubber particles.

Therefore, the volume resistivity of the thermoplastic elastomer composition of the present invention can be controlled freely by the amount of rubber component in the composition and the particle diameter of rubber and the particle diameter of rubber is substantially uniform so that it is a material having an extremely small fluctuation in conductivity.

In the inventive composition, conductive vulcanized rubber particles and optional non-conductive rubber particles are finely and stably dispersed in the matrix phase of a thermoplastic resin. The conductivity imparting agent exists in the conductive vulcanized rubber particles and as a result, when a voltage is applied to the inventive composition, electrons flow the matrix phase through the conductive rubber particles. By controlling at least one of the conductivity (volume resistivity) of rubber particle, amount, particle diameter, structure, and kind of rubber particle, and the conductivity (volume resistivity) of matrix phase or by controlling a combination of these, the conductivity of the inventive composition can be controlled in a wide range of from a conductive region ($10^4$ (Ω·cm) or less) to an insulating region ($10^{10}$ (Ω·cm) or more). In particular, the conductivity in the region where conventionally it has been difficult to achieve without any fluctuation such as $10^4$ to $10^{13}$ (Ω·cm), more preferably $10^4$ to $10^{10}$ (Ω·cm), and furthermore $10^5$ to $10^9$ (Ω·cm).

In the present invention, the descriptions regarding volume resistivity of $10^4$ (Ω·cm) or $10^{13}$ (Ω·cm) indicate the order of 4th power or 13th power, respectively. Thus, $10^4$ to $10^{13}$ (Ω·cm) specifically means $1.00\times10^4$ to $9.99\times10^{13}$ (Ω·cm), $10^4$ to $10^{10}$ (Ω·cm) specifically means $1.00\times10^4$ to $9.99\times10^{10}$ (Ω·cm), $10^5$ to $10^9$ (Ω·cm) specifically means $1.00\times10^5$ to $9.99\times10^9$ (Ω·cm), and $10^4$ (Ω·cm) in the conductive region specifically means a volume resistivity of $9.99\times10^4$ (Ω·cm) or less, preferably $1.00\times10^4$ (Ω·cm) or less.

The control of the conductivity (volume resistivity) of rubber particles is possible by controlling the conductivity of the rubber composition constituting the rubber particles. The conductivity control of rubber composition is achieved by a conductivity controlling method for rubber compositions conventionally used. That is, the conductivity of the rubber composition can be varied by varying the conductivity of raw material rubber which is a constituent component of the rubber composition and the kind and amount of conductivity imparting agent. When 20 parts by weight of a conductivity imparting agent, for example, carbon black having excellent conductivity such as Kitchen Black (a product of AKZO) is compounded in 100 parts by weight of raw material rubber, the conductivity of the resulting rubber composition is in a conductive region ($10^4$ (Ω·cm) or less) regardless of the conductivity of the raw material. On the contrary, the conductivity of the rubber composition that contains no conductivity imparting agent has a conductivity in an insulating region ($10^{10}$ to $10^{15}$ (Ω·cm)). By suitably selecting the conductivity (polarity) of raw material rubber and adjusting the amount of conductive carbon black in the range of less than 20 parts by weight, a rubber composition having a conductivity in a medium region of $10^5$ to $10^6$ (Ω·cm) can be obtained. (However, it is difficult to obtain a conductivity of $10^7$ to $10^9$ (Ω·cm) in a stable manner.) Using the thus adjusted rubber composition, the conductivity of rubber particles can be controlled as described above. Even if the rubber particle contains the same amount of conductivity imparting agent, it contributes more to conductivity that the conductivity imparting agent is present on or near the interface between the rubber particle and the matrix phase rather than it is present within the rubber particle. As the method of increasing the concentration of the conductivity imparting agent near the interface can be used a method of dispersing in the matrix phase rubber particles each comprising a core and an outer layer made of two kinds of rubbers having higher and lower polarities, respectively. The conductivity imparting agent is incorporated into the rubber having a higher polarity rather than the rubber having a lower polarity. Therefore, by designing the structure of rubber particles to be of a two-layer structure such that the core which is present inside is made of a rubber having a lower polarity and outside thereof is present a rubber having a higher polarity, the conductivity imparting agent can be made present on or near the interface between the matrix phase and the rubber particle. This construction can be obtained by arranging that the product of the volume fraction ratio ($\phi_1/\phi_2$) between the rubber (1) having a lower polarity and the rubber (2) having a higher polarity and the viscosity ratio ($\eta_2/\eta_1$) at the time of kneading satisfies the following formula:

$$(\phi_1/\phi_2)\times(\eta_2/\eta_1)<1.$$

Next, the conductivity of thermoplastic elastomer composition can be controlled by a method of varying the kind and amount of conductivity imparting agent to be contained in the dispersed rubber particles. Rather, a method of providing a conductive rubber composition and a non-conductive rubber composition in advance and varying the ratio of one to the other of the two compositions to control the conductivity of the final composition is easier and preferred in view of uniform dispersion of the conductivity imparting agent in the rubber.

Further, the particle diameter of rubber particles can be controlled by selecting compatibility between the resin and rubber, kneading temperature, or shearing speed upon production of the inventive composition as described later on.

The conductivity of the matrix phase can be controlled by selecting the kind of the thermoplastic resin contained in the inventive composition.

Thus, the inventive composition, the conductivity of which as a whole can be controlled by controlling at least one of the conductivity and dispersion state of rubber particles and the conductivity of the matrix phase, can stably and without any complex control have a conductivity in a semiconductive region, i.e., $10^4$ to $10^{13}$ (Ω·cm), preferably $10^4$ to $10^{10}$ (Ω·cm), particularly $10^5$ to $10^9$ (Ω·cm), of which region it has conventionally been difficult to obtain a composition having a constant conductivity stably.

The inventive composition has a structure such that the distance between rubber particles carrying the conductivity imparting agent decrease to give an increased conductivity when pressure is applied to, i.e., a structure having a pressure-sensitive conductivity, so that it can be used also as a pressure-sensitive conductive composition.

The thermoplastic resin used as the thermoplastic resin matrix phase for use in the present invention includes various thermoplastic resins and compositions thereof. That is, it may be a single thermoplastic resin or a composition, or a composition of mixtures of these.

Specific examples of the thermoplastic resin includes polyolefin resins, polyamide resins, polyester resins, polystyrene resins, polynitrile resins, polymethacrylate resins, polyvinyl resins, cellulose resins, fluoro resins, imide resins, styrene, olefin, polyester, or urethane based thermoplastic elastomers, etc.

The rubber particles used as the domain phase dispersed in the above thermoplastic resin matrix phase is one at least a part of which is crosslinked.

Various rubbers can be utilized as the rubber component for constituting the rubber particles. Examples thereof include diene rubbers and hydrogenated products thereof (for example, NR, IR, epoxylated natural rubbers, SBR, BR (high cis BR and low cis BR), NBR, hydrogenated NBR, hydrogenated SBR), olefin rubbers (for example, ethylene-propylene rubber (EPDM, EPM), maleic acid modified ethylene-propylene rubber (M-EPM), IIR, copolymers of isobutylene with aromatic vinyl or diene monomer, acrylic rubber (ACM), ionomer), halogen containing rubbers (for example, Br-IIR, Cl-IIR, brominated product of isobutylene-p-methylstyrene copolymers (BIMS), CR, hydrin rubbers (CHR), chlorosulfonated polyethylenes (CSM), chlorinated polyethylene (CM), maleic acid modified chlorinated polyethylenes (M-CM), silicone rubbers (for example, methyl vinyl silicone rubber, and methyl phenyl vinyl silicone rubber), sulfur containing rubbers (for example, polysulfide rubber), fluoro rubbers (for example, vinylidene fluoride rubbers, fluorine containing vinyl ether rubbers, and fluorine containing phosphazene rubber), and thermoplastic elastomers (for example, styrene elastomer, olefin elastomer, ester elastomer, urethane elastomer, and polyamide elastomer)

In particular, as a preferred structure of rubber particles, it is preferred that the rubber particles are of a two-layer structure in which the conductivity imparting agent exists concentrated on the outer side of the two-layer structure. To achieve this, in the case where the polarity of the outer side of the rubber particle is made higher than that of the inner side of the rubber particle, specifically a rubber having a relatively high polarity, such as CR, NBR, hydrin rubber, chlorosulfonated polyethylene, urethane rubber, fluoro rubber, or polysulfide rubber may be arranged on the outer side and a non-polar rubber, such as IIR, EPR, silicone rubber, NR, SBR, BR, or IR on the inner side of the rubber particle.

The proportion of the thermoplastic resin composition forming the thermoplastic resin matrix phase to the rubber composition forming the rubber particle, the domain phase, is not limited particularly but it is preferable that the weight ratio of the thermoplastic resin composition to the rubber composition be in the range of 20/80 to 90/10. If the blending amount of the thermoplastic resin composition is large, the obtained thermoplastic elastomer composition has a decreased flexibility. On the contrary, if it is too small, the melt flow of the thermoplastic elastomer composition is decreased so that molding processing is difficult and if it is extremely small, the thermoplastic resin composition as a continuous phase cannot physically cover the rubber particles as a domain phase, resulting in that it tends to be difficult to conduct kneading.

As the conductivity imparting agent used in the present invention may be utilized any conventionally known conductivity imparting agent, preferably metal fillers and carbon fillers. Examples of the metal fillers include metal powders such as Ag powder, Ni powder, Cu powder, and Ag-plated Cu powder, metal fibers such as brass fiber, Al fiber, Cu fiber, and stainless steel fiber, metal flakes, etc. Each of them has a volume resistivity on the order of $10^{-6}$ (Ω·cm). On the other hand, carbon fillers include carbon blacks such as furnace black, acetylene black, and thermal black, graphite, carbon fiber, etc. The inventive composition may contain either one or both of the metal filler and carbon filler.

The inventive composition preferably contains such a conductivity imparting agent, in particular, in the outer layer of two-layer structure rubber particles so that the rubber particles have a volume resistivity smaller than that of the thermoplastic matrix phase.

Furthermore, by varying the content of the conductivity imparting agent in the rubber particles or by blending rubber particles with different conductivities, the volume resistivity of the whole composition can be controlled.

The blending amount of the conductivity imparting agent can be decided appropriately depending on the kind of conductivity imparting agent and the dimension of conductivity required for rubber particles, and further the composition.

The addition amount of metal powder or metal fiber may be decided appropriately depending on the conductivity to be imparted to the inventive composition and the conductivity of metal selected but it is not limited particularly.

The conductive carbon black used in the present invention is added in order to impart conductivity to the composition and is distinguished from carbon black which is used as a filler/reinforcing agent and has a DBP (dibutyl phthalate) absorption of 90 (ml/100 g) or more, preferably 100 (ml/100 g) or more, and more preferably 150 to 400 (mg/100 g). Any kind of conductive carbon black may be used so long as it has a volume resistivity in the range of $10^4$ to $10^{13}$ (Ω·cm) as a final composition and may be selected appropriately depending on the conductivity but is not limited particularly. Examples of such a conductive carbon include #3050B, #3150B, #3750B, and #3950B manufactured by Mitsubishi Chemical Corporation, Ketjen Black EC and DJ-600 manufactured by Nippon EG Co., Ltd., #4500 and #5500 manufactured by Tokai Carbon Co., Ltd. and acetylene black manufactured by Denki Kagaku Kogyo Kabushiki Kaisha, etc.

The addition amount of conductive carbon black may be decided appropriately depending on the conductivity of the rubber particles contained in the inventive composition and further on the conductivity to be imparted to the inventive composition but is not limited particularly. For example, when the conductivity of rubber particles is set to be in a conductive region ($\leqq 10^4$ (Ω·cm)), the conductive carbon black may be added in an amount of about 20 parts by weight or more per 100 parts by weight of rubber of the composition.

Preferably, the conductive carbon black is not contained in the matrix phase but is contained in the rubber particles. This is because it ensures a more reliable control of volume resistivity.

The rubber composition may in addition to the above conductivity imparting agents contain vulcanizing agents, vulcanizing accelerators, anti-aging agents, fillers, softening agents, plasticizers, oxidation inhibitors, ultraviolet absorbents, colorants such as pigments or dyes, reinforcing agents such as carbon black that is blended generally in rubbers but is not classified as a conductive carbon black, if necessary.

In particular, generally blended carbon blacks themselves do not have an effect of imparting conductivity to such an extent that the resulting composition can be imparted a conductivity up to the conductive region but is effective in stabilizing the conductivity of the composition which is blended with conductive carbon black and it is preferred to be blended with such.

The inventive composition may be blended with additives such as plasticizers, compatibilizers, vulcanization accelerators, anti-aging agents, oxidation inhibitors, ultraviolet absorbents, colorants such as pigments or dyes, processing auxiliaries in addition to the above essential components in a range so long as the objects of the present invention are not damaged.

In particular, it may be decided whether the conductivity imparting agent is to be added to the rubber composition in advance or during kneading depending on the difference in conductivity (polarity) between the thermoplastic resin forming the matrix and the raw material rubber constituting the rubber particles. That is, where there is no or small, if any, difference in polarity between the thermoplastic resin and raw material rubber, it is preferred that the conductivity imparting agent is added to the rubber composition in advance. Whereas, where the polarity of raw material rubber is high as compared with the thermoplastic resin, it can be added during kneading so that it can exist on the interface between the rubber particles and the matrix phase more effectively.

The inventive composition is preferably a thermoplastic elastomer composition which is produced by kneading a thermoplastic resin and a rubber component with simultaneously proceeding crosslinking, i.e., so-called dynamic crosslinking allowing the crosslinking to proceed dynamically. Utilization of such a production method allows the resulting thermoplastic elastomer composition to be in a state where in a thermoplastic resin phase at least a portion of which constitutes a continuous phase is finely dispersed a crosslinked rubber phase at least a portion of which constitutes a discontinuous phase so that the resulting thermoplastic resin behaves like a crosslinked rubber and because its continuous phase is at least constituted by a thermoplastic resin, it can be processed similarly to a thermoplastic resin upon the molding processing.

In producing the inventive composition, no limitation is posed on the machine used for kneading and examples thereof include a screw extruder, a kneader, a Banbury mixer, a twin-screw extruder, etc. In particular, use of a twin-screw extruder is preferred in view of kneading and dynamic crosslinking. Further, kneading can be performed serially using two or more kneading machines.

The rubber particles, the domain phase of the inventive composition, are crosslinked at least partially. The inventive composition as such can be produced by so-called dynamic crosslinking, i.e., preliminarily kneading a rubber component that forms rubber particles with a conductivity imparting agent and additives other than crosslinking ones, melt-kneading the thus-treated rubber component, a thermoplastic resin component, and optionally other additives as needed in a twin-screw extruder or the like, adding a crosslinking agent for crosslinking the rubber particles while dispersing the rubber particles in the thermoplastic resin matrix phase to effect crosslinking dynamically during the kneading. Dynamic crosslinking may be performed by kneading at 150 to 300° C. using, for example, a sulfur base, organic peroxide base, metal oxide base, or phenol resin, quinone dioxime crosslinking agent.

The kind of crosslinking agent, dynamic crosslinking conditions (temperature, time), etc. may be decided appropriately depending on the composition of the rubber composition but not limited particularly.

As the crosslinking agent may be used the above-described ones. More particularly, sulfur based crosslinking agent includes powderish sulfur, depositing sulfur, high dispersion sulfur, surface treated sulfur, insoluble sulfur, dimorpholine disulfide, alkylphenol disulfide, etc. It may be used in an addition amount on the order of, for example, 0.5 to 4 parts by weight per 100 parts by weight of rubber.

The organic peroxide base crosslinking agent include benzoyl peroxide, t-butyl hydroperoxide, 2,4-dichlorobenzoyl peroxide, 2,5-dimethyl-2,5-di(t-butylperoxy)hexane, 2,5-dimethylhexane-2,5-di (peroxybenzoate), etc. It maybe used in an amount on the order of, for example, 1 to 15 parts by weight per 100 parts by weight of, rubber.

Further, the phenol resin base crosslinking agent includes bromide of alkylphenol resins and mixed crosslinking agent containing a halogen donor such as tin chloride or chloroprene and an alkylphenol resin. It may be used in an amount on the order of, for example, 1 to 20 parts by weight per 100 parts by weight of rubber.

Other crosslinking agents include, for example, zinc white (on the order of 5 parts by weight), magnesium oxide (on the order of 4 parts by weight), litharge (on the order of 10 to 20 parts by weight), p-quinone dioxime, p-dibenzoyl quinone dioxime, tetrachloro-p-benzoquinone, poly(p-dinitrosobenzene) (on the order of 2 to 10 parts by weight), and methylene dianiline (oh the order of 0.2 to 10 parts by weight).

If necessary, a crosslinking accelerator may be added. General crosslinking accelerators such as aldehyde-ammonia base, guanidine base, thiazole base, sulfenamide base, thiuram base, dithioic acid salt base, and thiourea base crosslinking accelerator may be used in an amount on the order of, for example, 0.5 to 2 parts by weight.

More specifically, the aldehyde-ammonia base crosslinking accelerator include hexamethylenetetramine, etc.;

The guanidine base crosslinking accelerator includes diphenylguanidine, etc.;

The thiazole base crosslinking accelerator includes, dibenzothiazyl disulfide (DM), 2-mercaptobenzothiazole and Zn salt thereof, cyclohexylamine salt of 2-(4'-morpholinodithio) benzothiazole, etc.;

The sulfenamide base crosslinking accelerator includes cyclohexylbenzothiazolylsulfenamide (CBS), N-oxydiethylenebenzothiazolyl-2-sulfenamide, N-t-butyl-2-benzothiazolylsulfenamide, 2-(dimorpholinyldithio) benzothiazole, etc.;

The thiuram base crosslinking accelerator includes tetramethylthiuram disulfide (TMTD), tetraethylthiuram disulfide, tetramethylthiuram monosulfide (TMTM), dipentamethylenethiuram tetrasulfide, etc.;

The dithioic acid base, crosslinking accelerator includes Zn dimethyldithiocarbamate, Zn diethyldithiocarbamate, Zn di-n-butyldithiocarbamate, Zn ethylphenyldithiocarbamate, Te diethyldithiocarbamate, Cu dimethyldithiocarbamate, Fe dimethyldithiocarbamate, pipecholine pipecholyldithiocarbamate, etc.;

The thiourea base crosslinking accelerator includes ethylenethiourea, diethylthiourea, etc.

As the crosslinking accelerator may be used general aids for rubber. For example, zinc white (on the order of 5 parts by weight), stearic acid, oleic acid or Zn salts thereof (on the order of 2 to 4 parts by weight), etc. may be used.

Other construction may be used in addition to the above construction. For example, when the thermoplastic resin component and rubber component have different compatibility, a compatibilizer may be used to render the both components compatible with each other. Mixing a compatibilizer in the system decreases the interfacial tension between the thermoplastic resin component and rubber component and as a result the particles of rubber dispersion phase become finer, so that the characteristics of the both components can be exhibited more effectively. As such a compatibilizing agent can be used generally those copolymers having the structure corresponding to either one or both of the thermoplastic resin component and rubber component, or those copolymers having an epoxy group, a carbonyl group, a halogen group, an amino group, an oxazolinyl group, a hydroxyl group or the like that is capable of reacting with the thermoplastic resin component or rubber component. They may be selected depending on the kind of the thermoplastic resin component or rubber component to be mixed therewith. Usually used compatibilizer includes styrene-ethylene-butylene block copolymer (SEBS) and maleic acid modified products thereof, maleic acid modified products of EPM, EPDM, EPDM-styrene or EPDM-acrylonitrile graft copolymers and maleic acid modified products thereof, styrene/maleic acid copolymer, reactive phenoxy resin, etc.

Using the dynamic crosslinking conditions of, for example, a temperature of 150 to 300° C., a relatively high shearing speed of 500 to 7,500 $sec^{-1}$, the conductive rubber particle can be made as fine as having a particle diameter of 50 μm or less, preferably 1 to 10 μm. As a result, the distance of rubber particles is decreased, which increases the conductivity of the composition.

The total volume resistivity of the inventive composition thus obtained can be controlled by controlling the content of conductivity imparting agent in the rubber particles and further controlling the kind of the conductivity imparting agent in the rubber particles, the amount of rubber particles, the dispersibility of rubber particles, etc., as described above.

For example, if about 70 parts by weight or more of the rubber composition having a conductivity in a conductive region ($\leqq 10^4$ (Ω·cm)) is blended with 100 parts by weight of the insulating thermoplastic resin, the resulting composition has a conductivity in a conductive region. On the other hand, if the rubber composition having a conductivity in an insulating region ($10^{12}$ (Ω·cm)) is blended with the insulating thermoplastic resin, the resulting composition has a conductivity in an insulating region. Furthermore, the volume resistivity of the inventive composition can be controlled by blending a rubber composition having a conductivity in a conductive region and a rubber composition having a conductivity in an insulating region with the thermoplastic resin in the matrix phase.

Further, selection of the blending ratio of the rubber composition having a conductivity in a conductive region to the thermoplastic resin also enables control of the volume resistivity of the composition. For example, by blending a rubber composition having a conductivity in a conductive region in an amount of approximately 100 to 200 parts by weight per 100 parts by weight of the thermoplastic resin, the resulting composition is controlled to have a conductivity in a semiconductive region.

As described above, the control of the conductivity of rubber particles dispersed in the composition by addition of a conductivity imparting agent and introduction of it into the rubber particles, the state of dispersion of rubber particles and further the resistivity of matrix phase enable the conductivity to be controlled in a wide range of from a conductive region ($10^4$ (Ω·cm)) to an insulating region ($10^{10}$ (Ω·cm)).

Since such a control is achieved by a method involving factors that can be easily controlled, such as the amount or dispersion state of conductivity imparting agent in the conductive rubber particles, it can be more easily attained than the control of resistivity of the conventional conductive rubber composition and the like and enables stable and reliable control of resistivity, so that there can be obtained the effect of high yield in the production of the composition.

Since the inventive composition has a structure that is also a pressure-sensitive conductive structure, it can be utilized as a pressure-sensitive conductive composition.

In particular, the conductivity of the inventive composition can be controlled to be in a range of $10^4$ to $10^{13}$ (Ω·cm), preferably $10^4$ to $10^{10}$ (Ω·cm), and furthermore $10^5$ to $10^9$ (Ω·cm) in an semiconductive region.

The inventive composition can be used advantageously in products that use compositions having thermoplastic properties, rubber elasticity and conductivity, such as static rollers, antistatic sheets, and conductive belts for various OA appliances, cleaners, panel covers for appliances, interiors for clean rooms, housings for IC related parts and IC products, fuel tanks, electrodes for sensors, ground poles, face heating elements, antistatic inner or outer tube for hoses, flooring materials for construction, etc.

EXAMPLES

Hereafter, the present invention will be described more specifically by examples. However, it should not be construed that the present invention is limited thereto.

Examples 1 to 8

Production of Thermoplastic Elastomer Composition

Various compositions in formulations shown in Table 3 below were produced as follows.

First, the rubber composition shown in Table 1 below was mixed in a closed Banbury mixer at an initial temperature of 40° C. for 2 minutes to prepare a rubber master batch, which was rolled into a sheet and then pelletized using a pelletizer for rubbers.

The obtained rubber pellets were pressed into a sheet, whose volume resistivity was measured. The measured values are shown in Table 1.

Then, the rubber pellets and resin pellets in the proportion shown in Table 3 were charged in a twin-screw kneading extruder and melt-kneaded. Thereafter, a vulcanizer was charged continuously to dynamically crosslink the rubber component as the domain phase dispersed in the resin component as the matrix phase. The dynamic crosslinking was completed after performing the kneading under the conditions of a kneading temperature of 200 to 250° C., a kneading time of 3 minutes, a shearing speed of about 1,000 $sec^{-1}$ to obtain a thermoplastic elastomer composition. The obtained composition was passed through a T die of a single screw extruder to form a sheet and its volume resistivity was measured. The measured values are shown in Table 3. The unit for the compounds in Table 3 are parts by weight.

The resin component was also formed into a sheet using a T die and its volume resistivity was measured. The measured values are shown in Table 2.

Method for Measuring the Volume Resistivity and Range of Volume Resistivity

Each of 5 sheets (30 cm×30 cm) of rubber composition, resin, and thermoplastic elastomer composition was measured volume resistivity at any 10 positions and an average value was expressed in an exponential.

Also, a logarithm was obtained from each of 10 volume resistivity vales and a difference between the maximum and minimum values was indicated as a fluctuation in volume resistivity.

The thermoplastic elastomer composition in the form of a sheet was cut to an ultra-thin section, which was observed under a transmission electron microscope (TEM) to obtain a particle diameter of dispersed rubber. Further, by calculation, the volume of conductive rubber particles was obtained. This is also shown in Table 3.

Comparative Example 1

A composition was obtained in the same manner as in Example 1 except that no conductivity imparting agent was blended.

TABLE 1

| | Rubber blend | | | | | | |
|---|---|---|---|---|---|---|---|
| | 1 | 2 | 3 | 4 | 5 | 6 | 7 |
| Rubber component | | | | | | | |
| EFDM | 100 | 100 | 100 | 100 | | | 100 |
| Br-IIR | | | | | | 40 | |
| NBR | | | | | | 60 | |
| ACM | | | | | 100 | | |
| Conductivity imparting agent | | | | | | | |
| Conductive carbon | 0 | 20 | 40 | | 20 | 20 | 7 |
| Cu powder | | | | 70 | | | |
| Additive | | | | | | | |
| Paraffin oil | 50 | 50 | 50 | 50 | | 20 | 50 |
| Talc | 10 | 10 | 10 | 10 | | | 10 |
| Volume resistivity (Ω · cm) | $4.11 \times 10^{12}$ | $2.11 \times 10^{4}$ | $1.01 \times 10^{3}$ | $3.21 \times 10^{1}$ | $1.66 \times 10^{4}$ | $4.12 \times 10^{3}$ | $5.83 \times 10^{8}$ |
| Range of volume resistivity (exponential of 10) | 0.05 | 0.3 | 0.2 | 0.2 | 0.3 | 0.3 | 2.2 |

TABLE 2

| Volume resistivity of resin | Volume resistivity (Ω · cm) | Range of volume resistivity (exponential of 10) |
|---|---|---|
| Polypropylene resin | $1.60 \times 10^{14}$ | 0.02 |
| Nylon 666 | $8.25 \times 10^{12}$ | 0.05 |
| Polyester resin | $2.53 \times 10^{12}$ | 0.05 |

TABLE 3

| | Comparative Example | Example | | | | | | | | | | |
|---|---|---|---|---|---|---|---|---|---|---|---|---|
| | 1 | 1 | 2 | 3 | 4 | 5 | 6 | 7 | 8 | 9 | 10 | 11 |
| Thermoplastic resin | | | | | | | | | | | | |
| Polypropylene resin | 100 | 100 | 100 | 100 | 100 | 100 | | 100 | | 100 | 100 | 100 |
| Nylon 666 | | | | | | | | | 100 | | | |

TABLE 3-continued

| | Comparative Example | Example | | | | | | | | | | |
|---|---|---|---|---|---|---|---|---|---|---|---|---|
| | 1 | 1 | 2 | 3 | 4 | 5 | 6 | 7 | 8 | 9 | 10 | 11 |
| Polyester resin | | | | | | | 100 | | | | | |
| Rubber | | | | | | | | | | | | |
| Rubber blend | | | | | | | | | | | | |
| 1 | 160 | | | 80 | 120 | | | | | 130 | 140 | 150 |
| 2 | | 180 | | | | | | | | | | |
| 3 | | | 200 | 100 | 50 | | | | | 40 | 30 | 20 |
| 4 | | | | | | 230 | | | | | | |
| 5 | | | | | | | 120 | | | | | |
| 6 | | | | | | | | 140 | 140 | | | |
| Vulcanizing agent | | | | | | | | | | | | |
| Phenol bromide | 10 | 10 | 10 | 10 | 10 | 10 | | | | 10 | 10 | 10 |
| BTC | | | | | | | 1.6 | | | | | |
| S | | | | | | | | 1 | 1 | | | |
| Zno | | | | | | | | 3 | 3 | | | |
| CZ | | | | | | | | 0.5 | 0.5 | | | |
| TT | | | | | | | | 0.5 | 0.5 | | | |
| Stearic acid | | | | | | | | 1 | 1 | | | |
| Rubber particle diameter ($\mu$m) | 1 | 1 | 1 | 1 | 1 | 1 | 0.5 | 8 | 4 | 1 | 1 | 1 |
| Volume fraction of conductive rubber component (%) | 59 | 60 | 60 | 30 | 13 | 58 | 55 | 53 | 58 | 11 | 8 | 5 |
| Volume resistivity ($\Omega \cdot$ cm) | $2.05 \times 10^{14}$ | $3.11 \times 10^{8}$ | $1.01 \times 10^{7}$ | $5.12 \times 10^{8}$ | $2.34 \times 10^{10}$ | $1.03 \times 10^{4}$ | $3.66 \times 10^{7}$ | $4.25 \times 10^{7}$ | $7.11 \times 10^{5}$ | $3.63 \times 10^{11}$ | $1.85 \times 10^{12}$ | $4.11 \times 10^{13}$ |
| Fluctuation of volume resistivity (exponential of 10) | 0.05 | 0.2 | 0.2 | 0.3 | 0.4 | 0.2 | 0.2 | 0.8 | 0.6 | 0.5 | 0.9 | 1.0 |

From the above results, it can be seen that where rubber is mixed with conductive carbon as in rubber blend 7, the fluctuation in volume resistivity of the composition in a semiconductive region is very large in contrast to the thermoplastic elastomer composition of the present invention in which varying the particle diameter of rubber component, volume ratio of the conductive rubber component, the amount of conductivity imparting agent in the rubber composition, and the structure of rubber particle enables control of conductivity with a very small fluctuation over a wide range from a conductive region ($10^4$ ($\Omega\cdot$cm) or less) to an insulating region ($10^{10}$ ($\Omega\cdot$cm) or more) including a semiconductive region.

The compounds used in Examples and Comparative Example are as follows.

EPDM: Mitsui EPT4021 (a product of Mitsui Petrochemical Co., Ltd.)

Br-IIR: Exxon Bromobutyl 2244 (a product of Exxon Chemical, Inc.)

NBR: Perbunan NT 2865 (a product of Bayer)

ACM: AR31 (a product of Nippon Zeon Co., Ltd.)

Conductive carbon: Ketjen Black EC (a product of AKZO, Co.)

Cu powder: KE11 prescribed in JIS H 2114 was used.

Paraffin oil: Machine oil 22 (a product of Showa Shell Petrochemical Co., Ltd.)

Talc: Mistron Vapor (a product of Nippon Mistron Co., Ltd.)

Brominated alkylphenol resin: Tackiroll 250-I (a product of Taoka Chemical Industry Co.)

Butanetetracarboxylic acid (BTC): (a product of Mitsui Toatsu Fine Co.)

S: Powderish sulfur (a product of Karuizawa Refinery Co.)

ZnO: Zinc white No. 3 (a product of Seido Chemical Co.)

CZ: Nocceler CZ (a product of Ouchi Shinko Chemical Co.)

TT: Nocceler TT (a product of Ouchi Shinko Chemical Co.)

Stearic acid: Beads stearic acid NY (a product of Nihon Oil & Fat Co.)

Polypropylene resin: MJ170 (a product of Tokuyama Co.)

Nylon 666: 5013B (a product of Ube Industries, Ltd.)

Polyester resin: Hytrel 5577 (a product of Toray DuPont Co., Ltd.)

According to the present invention, thermoplastic elastomer composition whose volume resistivity can be controlled can be obtained. Such inventive composition can be used advantageously in products that use compositions having thermoplastic properties, rubber elasticity and conductivity, such as static rollers, antistatic sheets, and conductive belts for various OA appliances such as printers and copying machines, cleaners, housings for various IC products, fuel tanks, electrodes for sensors, ground poles, face heating elements, flooring materials for construction, etc.

What is claimed is:

1. A thermoplastic elastomer composition comprising a thermoplastic resin as a matrix phase and a rubber particle at least a part of which is crosslinked as a domain phase, wherein the rubber particle is a rubber particle at least a portion of which has an electrical conductivity to give the composition a controlled volume resistivity within a predetermined range of resistivity.

2. The thermoplastic elastomer composition as claimed in claim 1, wherein the controlled volume resistivity is $10^4$ to $10^{10}$ ($\Omega\cdot$cm).

3. The thermoplastic elastomer composition as claimed in claim 1, wherein the rubber particle contains a conductivity imparting agent selected from metal powder having a volume resistivity of $10^{-6}$ to $10^{-1}$ ($\Omega\cdot$cm) and/or conductive carbon black.

4. The thermoplastic elastomer composition as claimed in claim 3, wherein the rubber particle is of a two-layer structure which comprises a core and an outer layer and wherein at least the outer layer contains the conductivity imparting agent.

5. The thermoplastic elastomer composition as claimed in claim 1, wherein the controlled volume resistivity is $10^5$ to $10^9$ ($\Omega \cdot cm$).

6. A method of controlling a volume resistivity of a thermoplastic elastomer composition, comprising controlling a volume resistivity of a thermoplastic elastomer composition within a predetermined range of resistivity, said composition comprising a thermoplastic resin as a matrix phase and a rubber particle at least a part of which is crosslinked and which contains an electrical conductivity imparting agent as a domain phase, by controlling a volume fraction of the rubber particle having an electrical conductivity.

* * * * *

UNITED STATES PATENT AND TRADEMARK OFFICE

CERTIFICATE OF CORRECTION

PATENT NO. : 6,589,647 B1
DATED : July 8, 2003
INVENTOR(S) : Ozawa et al.

It is certified that error appears in the above-identified patent and that said Letters Patent is hereby corrected as shown below:

Title page,
Item [73], Assignee, the Assignee should read:
-- [73] Assignee: The Yokohama Rubber Company, Ltd., Tokyo (JP) --

Signed and Sealed this

Twenty-first Day of October, 2003

JAMES E. ROGAN
*Director of the United States Patent and Trademark Office*